May 25, 1926.

J. S. SUGGS 1,586,484

INSECT EXTERMINATOR

Filed August 9, 1924

J. S. Suggs.
INVENTOR

BY Victor J. Evans
ATTORNEY

WITNESS:

Patented May 25, 1926.

1,586,484

UNITED STATES PATENT OFFICE.

JOHN S. SUGGS, OF PENSACOLA, FLORIDA.

INSECT EXTERMINATOR.

Application filed August 9, 1924. Serial No. 731,089.

This invention relates to improvements in insect exterminators, the general object of the invention being to provide a lamp for attracting the insects to the device with means for forcing the insects gathering around the lamp into a solution which will kill them, the invention being designed to be used at night.

Another object of the invention is to provide the device with reflectors for intensifying the light so as to attract insects from great distances.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
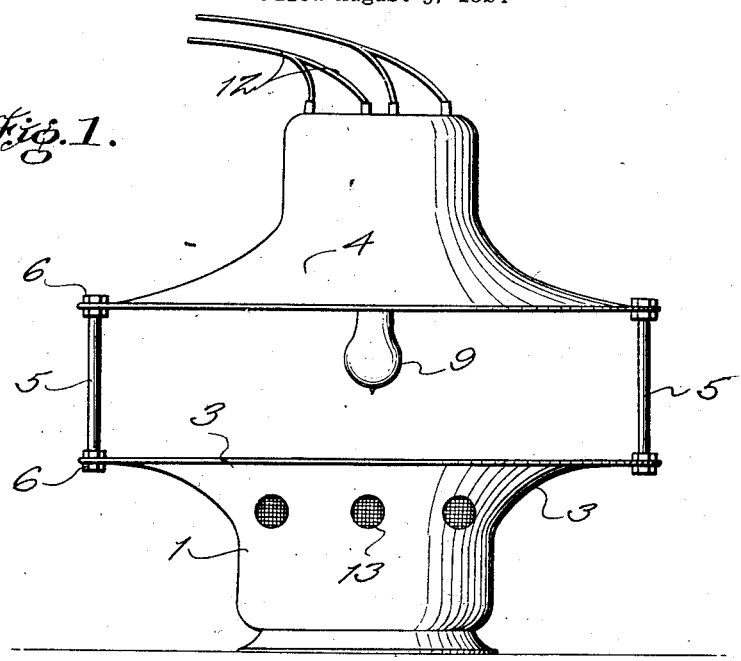
Figure 1 is an elevation of the device.
Figure 2:
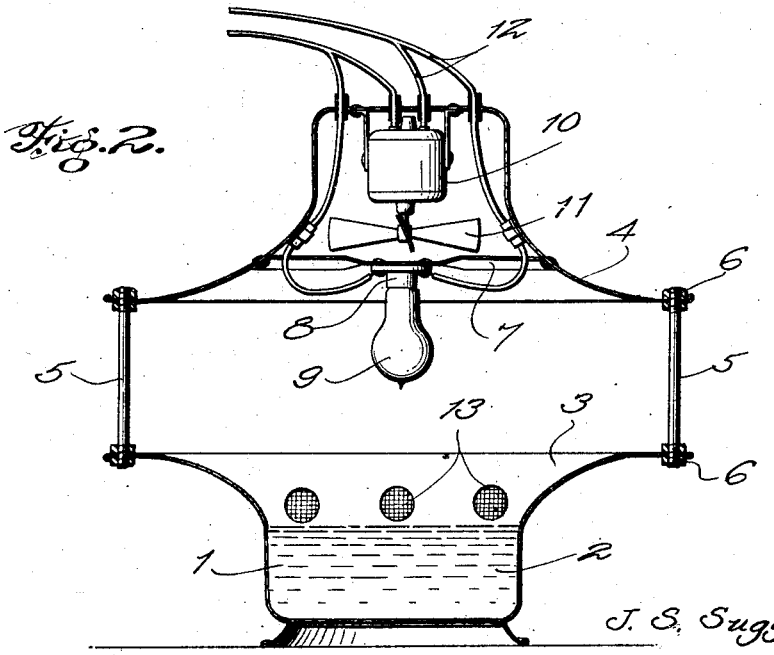
Figure 2 is a longitudinal sectional view.

In these views, 1 indicates a bowl-shaped base which is adapted to contain a solution 2 which may be kerosene, gasoline or any other kind of liquid that will quickly kill insects dropping into the same. The mouth part 3 of the bowl is so formed that it will reflect rays of light. An inverted bowl like member 4 is supported in spaced relation by the bowl 1 through the posts 5 which are fastened to the edges of the members 1 and 4 by the nuts 6. A spider 7 is arranged in the member 4 and supports a socket 8 for an electric bulb 9, the parts being so arranged that the bulb is located in the space between the two members 1 and 4. The mouth part of the member 4 is also formed to reflect light so that the rays of light from the lamp 9 will be intensified and thus the device will attract insects from great distances. An electric motor 10 is arranged in the upper part of the member 4 and has a fan 11 connected with the shaft. Conductors 12 lead from the motor and lamp socket to a suitable source of supply. Screen covered openings 13 are arranged in the member 1 above the level of liquid therein so that the air forced into the member 1 by the fan can escape therefrom.

From the foregoing it will be seen that when the device is placed in a locality where insects are to be destroyed and the lamp lighted at night the insects will be attracted by the light and will fly into the space between the members 1 and 4 and thus come in an air current passing downwardly through the space from the fan 11 and thus they will be forced into the liquid in the member 1 and thus be killed. The air entering the member 1 will escape through the screened openings 3. While I have shown an electric lamp and an electric motor it will of course be understood that other kinds of lamps can be used and the fan driven by the spring or other motor.

The device may be used in houses for destroying flies, mosquitoes and the like as well as in fields for destroying insects that injure plants growing in the field.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An insect exterminator comprising a pair of bowl-like receptacles, one of which is inverted, posts connecting the receptacles together in spaced relation, the lower receptacle having liquid therein and having screened openings therein above the liquid level, a spider in the upper receptacle, a lamp carried by the spider, said lamp projecting into the space between the two receptacles, a fan in the top part of the upper receptacle above the lamp and means for conducting current to the fan and lamp.

In testimony whereof I affix my signature.

JOHN S. SUGGS.